(12) United States Patent
Penz et al.

(10) Patent No.: US 6,423,931 B1
(45) Date of Patent: Jul. 23, 2002

(54) METHOD OF CONTROLLING THE MOVEMENT OF A LASER ENGRAVING HEAD

(75) Inventors: Andreas Penz, Vienna; Stephan Fazeny, Gmunden, both of (AT)

(73) Assignee: TROTEC Produktions- und Vertriebs GmbH, Linz (AT)

( * ) Notice: Subject to any disclaimer, the term of this patent is extended or adjusted under 35 U.S.C. 154(b) by 21 days.

(21) Appl. No.: 09/693,024

(22) Filed: Oct. 21, 2000

(51) Int. Cl.[7] .............................................. B23K 26/36
(52) U.S. Cl. ................................................. 219/121.69
(58) Field of Search ........................ 219/121.6, 121.61, 219/121.28, 121.69, 121.8, 121.81; 700/166; 347/224, 250, 263

(56) References Cited

U.S. PATENT DOCUMENTS 4,970,600 A * 11/1990 Garnier et al. ............... 358/299
5,854,751 A * 12/1998 Di Pietro et al. ....... 364/474.08
6,313,434 B1 * 11/2001 Patterson et al. ...... 219/121.69

FOREIGN PATENT DOCUMENTS

JP 363068285 A * 3/1988 ............ 219/121.62

* cited by examiner

Primary Examiner—Samuel M. Heinrich
(74) Attorney, Agent, or Firm—Karl Hormann

(57) ABSTRACT

A method of forming an image in a surface by a laser mounted for orthogonal movement parallel to the surface by correlating the time lag between energizing and discharging the laser to a profile of the velocity at which the laser is moved relative to the surface. The image may be formed by writing or engraving.

5 Claims, 5 Drawing Sheets

METHOD OF CONTROLLING THE MOVEMENT OF A LASER ENGRAVING HEAD

BACKGROUND OF THE INVENTION.

1. Field of the Invention

The invention, in general, relates to a novel method of controlling the movement of a laser engraving or printing head and, more particularly, to a method of controlling energization and discharge of a laser relative to its movement over a work surface to produce therein an undistorted image based on a bitmap.

2. Background of the Invention.

Apparatus utilizing a laser for engraving, or at least writing on, a suitable surface are well known. An example of such an apparatus is disclosed by U.S. Patent (Application No.: 09/508,739 filed Mar. 15, 2000) by Guettler and Penz. The apparatus functions by a tool head supporting a lens connected to a laser being moved relative to a work piece which is supported on a work surface and by periodically aiming pulses of collimated coherent light at the work piece to affect therein an image-wise surface alteration, by a plurality of indentations or pixels selectively placed so that together they form an image. The image may or may not be an inversion of a scanned or stored positive pattern or bitmap. The movement of the tool head may be responsive to signals, either directly or by way of a storage, derived from a device which mechanically or optically scans the pattern. The work piece may, for instance, consist of coated or anodized metals, paper, wood, or rubber etc. which is susceptible to the formation of indicia therein as a result of laser beam treatment.

The number of coherent light or laser beam discharges per inch of displacement of the laser tool head over the work piece and the duration of each pulse may be varied as an incremental position voltage as a function of the square root of the sum of the squares of the components of displacement of the tool head in orthogonal directions.

Basically, laser printing or engraving is carried out by line-scanning a bitmap and focussing a laser beam on a work piece, the laser beam being switched on at every image point (pixel) or off at every blank position, as the case may be, to form what for the sake of convenience may be referred to as a black and white image in the work piece. Gray-scale images are generated by changes in the intensity of the laser beam by modulating its pulse width. An encoder connected to the drive of the laser tool head provides position signals (pulses per angular unit) to a processor which in turn energizes the laser as a function of the pulses. Ideally, the laser is energized on the basis of a signal representative of the actual position of the tool head. The effect of any lag error, i.e. the difference between the desired and the actual position of the laser along a predetermined curve or line, may be insignificant and tolerable.

In processes of engraving rubber for fabricating stamps, a laser tool head may be moved at a velocity of about 30 cm/sec, and the maximum laser output power may not exceed 50 W. For engraving plastic tags or anodized aluminum, for example, the power output of lasers can generally be kept low as minimum power levels are required for the evaporation of anodized or plastic layers. Hence, the laser tool head may be moved at high velocities. In fact, apparatus is known wherein the laser tool head is moved at a velocity exceeding 1 m/sec. The quality of the resultant engravings have, however, been found to be wanting because of what appears to be an insufficient correction of the laser energization or compensation of the head velocity.

The problems inherent in bidirectional engraving processes in particular, are unfortunately readily apparent since pixels are directionally displaced, i.e. they are not aligned in precise vertical columns. In bidirectional engraving processes, the large time constant of the pulsed laser, at high velocities of the movement of the laser tool head, does in fact yield unusable results.

The difficulties inherent in energizing a laser render it difficult to provide high-speed engraving processes of acceptable precision with cost-efficient x-y plotters. The laser may be discharged at a rate of, e.g. of 500 ppi to form 500 pixels per linear inch of surface. In order to obtain an engraving of acceptable quality, the lag in energizing the laser as results from the physically and structurally conditioned response rate has to be adjusted as a function of the laser head velocity relative to the degree of plasma pre-ionization. Unless the lag is adjusted appropriately, a velocity of 1.5 m/sec of head movement and a laser energization period of >100 $\mu$sec lead to unacceptable errors greater than +/−150 $\mu$m. This is thrice the empirical resolution of 50 $\mu$m of the human eye.

OBJECTS OF THE INVENTION.

It is a primary object of the invention to provide a method of coordinating the intermittent movement of a tool head and the periodic discharge of a laser relative to a signal derived from a scanned pattern or bitmap such that pixels are formed in a work piece so as to result in a distortion-free image.

A more general object resides in a method of line engraving on the basis of a bitmap from a suitable source.

A particular object of the invention is to provide a corrective algorithm for controlling the interaction between the high-velocity intermittent movement of a laser head and the related periodic discharge of the laser to yield engravings of superior quality.

Still another object of the invention is to provide a method of bidirectionally engraving pixels in the surface of a work piece by a laser such that each individual pixel of a pattern is shifted to compensate for the lag of response of the laser.

It is also an object of the invention to correct image points as a function of the instantaneous velocity of the movement of the laser head in accordance with a predetermined velocity profile.

Yet another object of the invention resides in compensating for the inherent lag of laser energization by tool head movement.

A still further object of the invention resides in a method of laser engraving wherein a laser is discharged as a function of a correctional laser head displacement signal.

Other objects will in part be obvious and will in part appear hereinafter.

BRIEF SUMMARY OF THE INVENTION

In accordance with the above and other objects, the invention, in a preferred embodiment thereof, provides for shifting each pixel of an image so as to compensate for the lag in the discharge of the laser either on-line by a corrective process as a function of the instantaneous velocity or off-line on the basis of a preprogrammed velocity profile.

Preferably, the correction or compensation takes place during the acceleration path on the basis of an acceleration profile stored in the memory of a control device or on the basis of acceleration data collected by an encoder and fed to a control device.

DESCRIPTION OF THE SEVERAL DRAWINGS.

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF THE PREFERRED EMBODIMENT.

The invention may be realized in the manner hereinafter described by a computer of the kind commonly known as a PC which is connected to an input device and to a laser engraver or laser printer as an output device. Such output devices will hereafter sometimes be referred to as image forming devices Suitable input devices for purposes of the invention are those capable of providing digital information signals representative of a pattern or bitmap to be reproduced or copied. Among these are, without limitation, optical or mechanical scanners, digital photographs or digital cameras, so-called clipart, desk top publishing programs (DTP), CAD programs or word processing programs. On the basis of information signals received from the input device and processed in accordance with the invention, the laser engraver will then form, line by line, an image on a surface made of a material susceptible to alteration of the kind which leaves an image in or on the surface of a work piece. The work piece may be made, or be provided with a surface, of material capable of removal, color change or color addition under the action of a laser beam. Wood, anodized aluminum, coated or multi-colored plastics, coated metals, glass, acrylic resins, leather, paper, carton and many others may be mentioned as examples of such materials.

Figure 1:
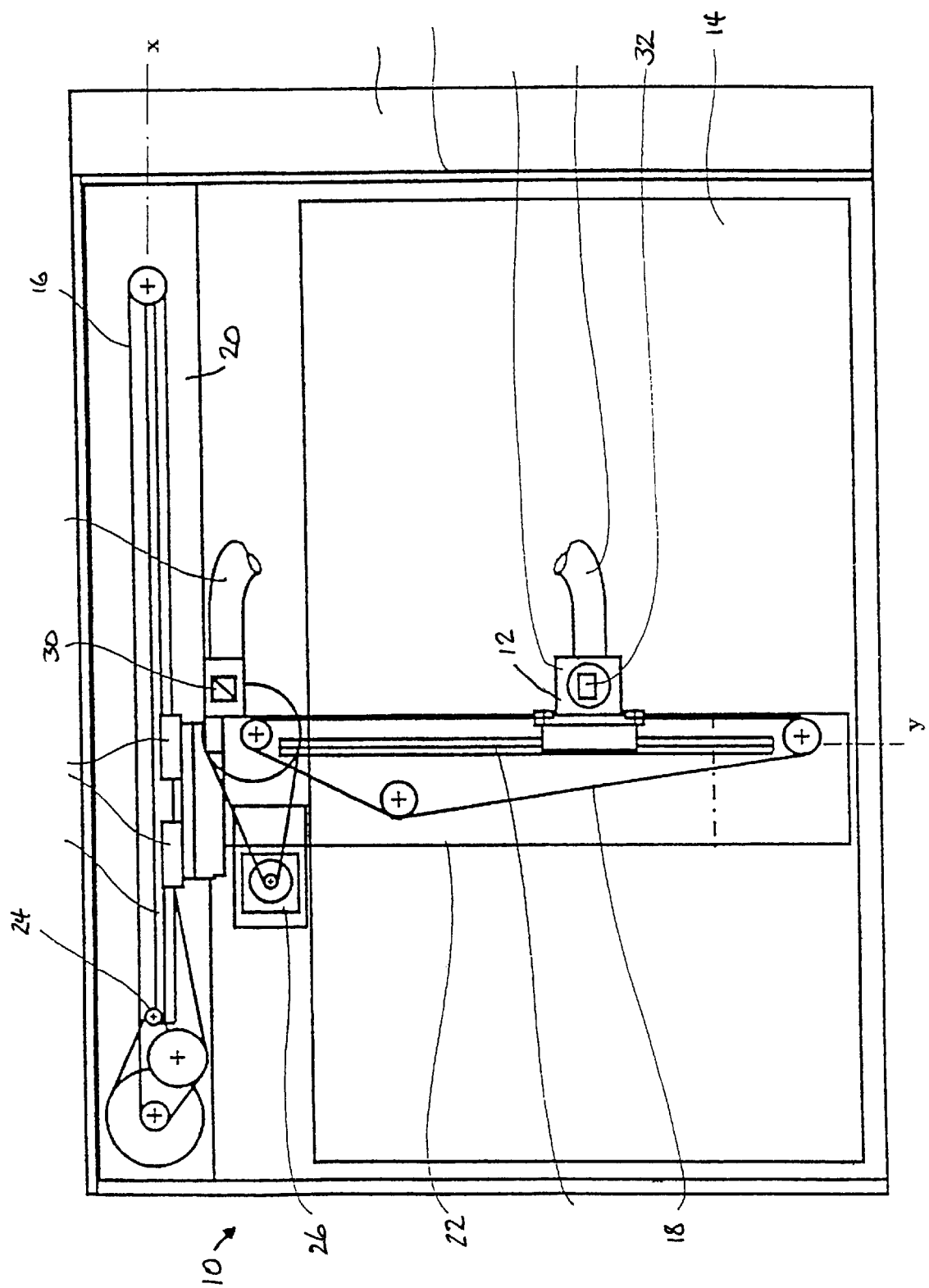
FIG. 1 is a schematic top elevational view of an engraving apparatus incorporating a laser tool head for practicing the instant invention.

FIG. 1 schematically depicts a laser engraver 10 of the kind disclosed by U.S. Patent (Application No. 09/508,739), by Guettler and Penz which is expressly incorporated by reference herein. It is provided with a tool head 12 suspended above a substantially flat work surface 14 for movement parallel thereto in orthogonal directions. To this end, the tool head 12 is moved by belt drives 16 and 18 along rails 20 and 22 in horizontal x and vertical y directions, respectively. Movement is imparted to the belt drives 16 and 18 by motors 24 and 26, respectively, under the control of an encoder 28 (FIG. 3).

Figure 3:
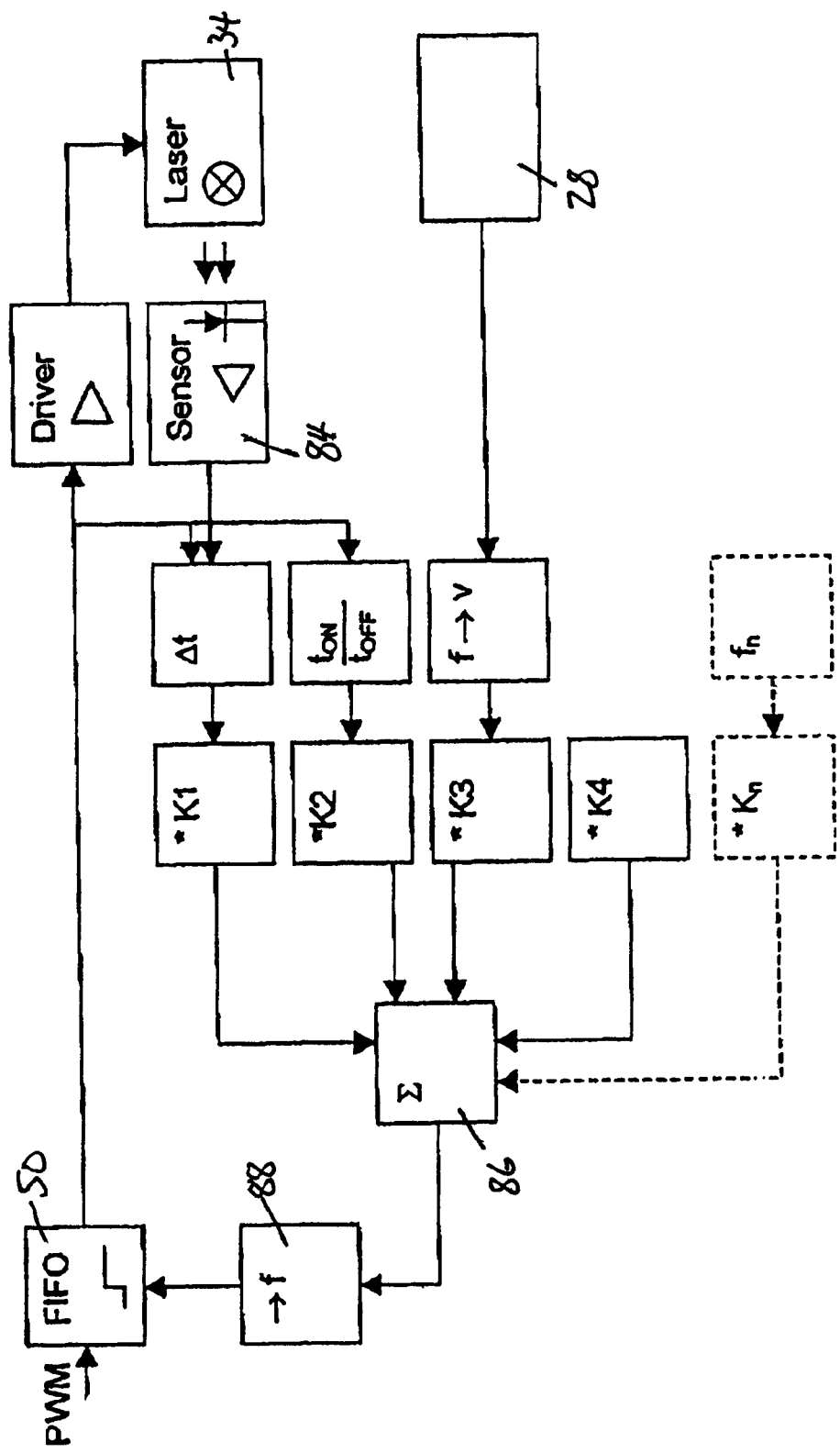
FIG. 3 is a block diagram of an aspect of the operation of a discrete or application specific integrated circuit.

Collimated coherent light is fed to a lens (not shown) in the laser tool head 12 by way of reflectors 30, 32 from a source of laser light preferably comprising a CO laser 34 (FIG. 3). As engraving processes of the kind here under consideration are notoriously dusty, vacuum exhaust hoses 36 and 38 are communicating with the reflectors 30 and 32. The instantaneous position of the laser tool head 12 is derived from pulses generated by the encoder 28 in response to movement of the head 12 in the x and y directions. The encoder 28 may impart movement signals as well as generate position signals.

Figure 2:
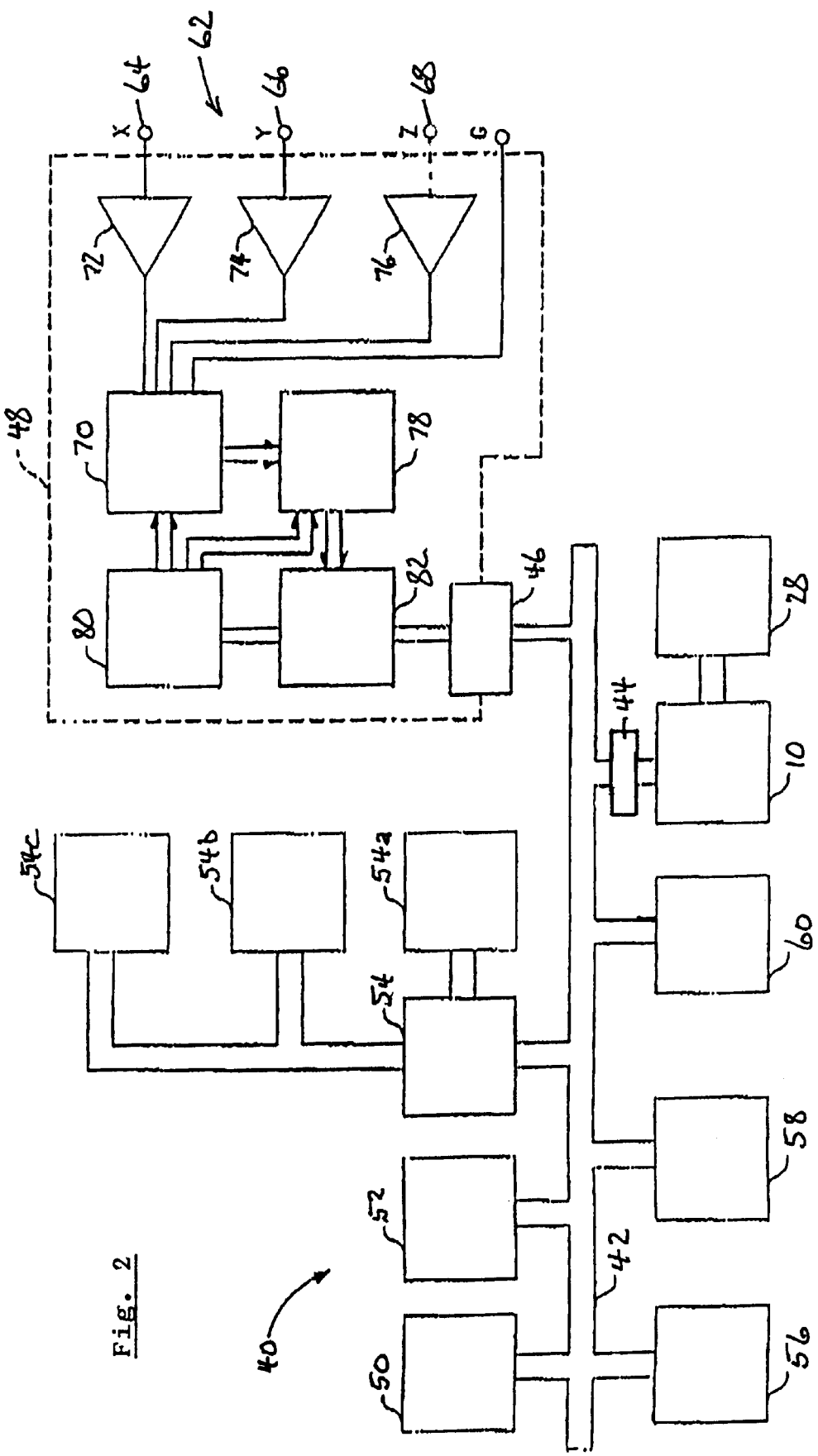
FIG. 2 is a block diagram of an exemplary apparatus for practicing the present invention.

The microprocessing system with its input and output peripherals is schematically shown in FIG. 2. It comprises a computer 40 which preferably is a PC. It is provided with a system bus 42 for conveying data, control, timing and address signals between the various modules of the computer 40. The bus 42 is provided with two serial or parallel input/output (I/O) units 44 and 46 for on-line connection with the laser engraver 10 and encoder 28 as well as with a signal receiving unit 48. Alternatively, the computer may control the laser engraver 10 in an off-line manner on the basis of signals stored in its memory or peripherals signal storage devices to be described.

Also connected to the bus 42 are a microprocessor 50, a memory 52, a disc control 54, a keyboard 56, a mouse 58 and a video display monitor 60. The memory 42 may comprise both random access (RAM) and read-only (ROM) sections. Preferably, it functions in the manner of a shift register.

The disc control 54 serves to control a hard disc 54a and, optionally, a floppy or optical disc drive 54b and a tape drive 54c as archival storage.

The signal receiving unit 48 may be responsive to any of the input devices referred to supra but has here been exemplarily shown as a scanner 62. The scanner 62 may be a mechanical one or, preferably an optical one. As schematically shown, it comprises three sensors 64, 66, 68 for scanning in and generating signals representative of the horizontal or x, vertical or y and perpendicular or z directions of a pattern. The sensors 64, 66, 68 may be mechanical one or, preferably, opto-electronic ones. The connection between the sensor 68 and the signal receiving unit 48 is shown in dashed lines to indicate that the sensor 68 is either optional or selectively connectable to the scanner 62. The sensors of the scanner 62 are connected to a multiplexer 70 by way of amplifiers 72, 74 and 76. The amplifiers may be low-noise amplifiers and may be designed to isolate the sensors 64, 66, 68 from power sources and from each other.

The signal receiving unit 48 may operate as an on-line unit, i.e. signals received by it from the scanner 62 or other input device may be immediately processed for controlling the laser engraver 10 in the manner of this invention. Alternatively, the signal receiving unit 48 may be provided or cooperate with an off-line signal storage facility for subsequent utilization of recorded data by the computer 40.

The output of the multiplexer 70 is connected to an analog to digital (A/D) converter 78. The A/D converter 78 and the multiplexer 70 are controlled by a microprocessor 80 which may be provided with a random access memory 82 for temporarily or optionally storing the digitized output signals from the A/D converter 78. The multiplexer 70 and the A/D converter 78 enable the sampling of the voltage levels at the output of the sensors 64, 66, 68 at a predetermined rate to produce digital signal samples representative of the pattern or bitmap from the output of the amplifiers. The output of the A/D converter 78 is initially fed to the random access memory 82 and subsequently to the memory 52 of the computer 40 either directly or by way of the hard disc 54a or either of the other drives 54b and 54b for processing by the microprocessor 50 and ultimately for coordinating the movement of the laser tool head 12 and discharge of the laser 34.

Scanning of the pattern or bitmap preferably takes place in a known manner on a line by line basis either unidirectionally or, preferably, in alternating directions, and the signals from the signal receiving unit 48 are taken into and dispensed from the memory 52 in the manner of a first-in first-out (FIFO) shift register.

Figure 6:
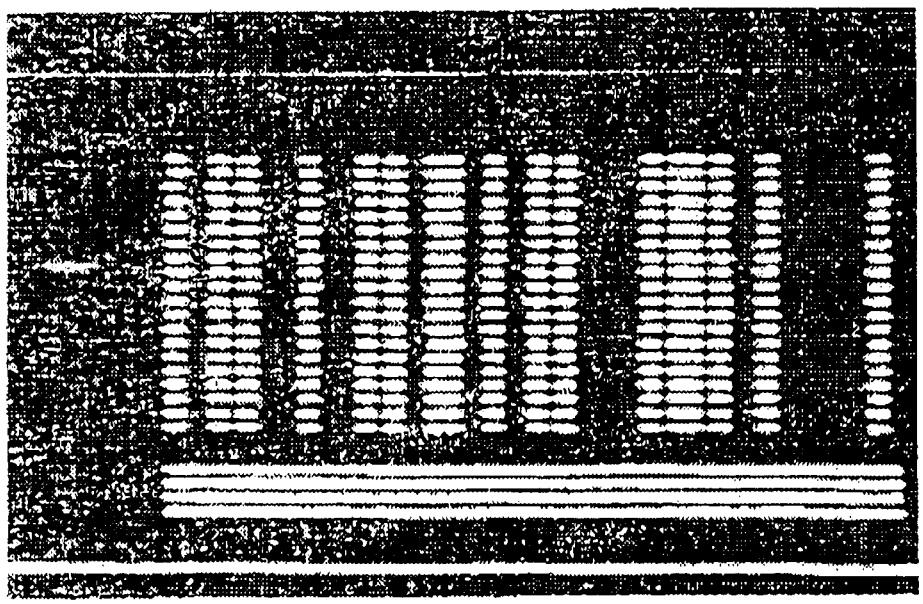
FIG. 6 depicts of pixels of an image obtained by the process in accordance with the invention.

The laser 34 is periodically discharged under the control of the microprocessor 50 on the basis of the data furnished, if off-line, by the memory 52 or, if on-line, from the signal receiving unit 48 and certain other parameters. The laser 34 is programmed by the microprocessor 50 to discharge precisely at the instant at which the position of the tool head 12 corresponds, in respect of the pixel to be formed, to the corresponding position in the real pattern as determined by the sensor 62 or of the "virtual" pattern previously stored in one of the memories 82 or 52. Accordingly the movement, or the velocity thereof, of the tool head 12 is controlled to take into consideration the time lag of the laser, or the laser is controlled by a pulse width modulation signal PWM adapted to the velocity profile of the tool head 12. The result is pixels properly aligned in the work piece as shown in FIG. 6.

In order to achieve this result, the microprocessor 50 is programmed to solve the following algorithm, and on the basis thereof to coordinate the discharge of the laser 34 with the movement of the laser tool head 12:

$$,_x = \text{sign}(v_{act}) * (k_1 * f_{1(,t\,laser)} + k_2 * f_{3(Vact)} + k_4 + J k_n * f_{n(parameter)})$$

wherein:

| | |
|---|---|
| , x | = Shift of a pixel [m]; |
| sign($v_{act}$) | = sign (+/−) of the vectorial velocity of movement for bidirectional engraving [1]; |
| $k_1$ | = constant for correcting the shift depending upon the delay in laser output power relative to the input signal (positive and negative range) [m/sec]; |
| $k_2$ | = constant for correcting shift dependent upon the on/off pulse ratio (positive and negative range) [m]; |
| $k_3$ | = constant for correcting of the velocity dependent shift (positive and negative range) [sec]; |
| $k_4$ | = constant for correcting a constant shift (positive and negative range) [m]; |
| $k_n$ | = constant for correcting the parameter dependent shift (positive and negative range); |
| J | = summing function; |
| $f_{1(,tLaser)}$ | = importance factor depending on the lag of response of the laser [sec]; |
| $f_{2(P)}$ | = importance factor depending on the on/off ratio [1]; |
| $f_{3(Vact)}$ | = importance factor depending on the velocity of movement (actual and desired velocity) [m/sec]; |
| $f_{n(parameter)}$ | = importance factor of the $n^{th}$ parameter (e.g. acceleration, etc.) |

An application specific integrated circuit is shown in FIG. 3. As may be seen in FIGS. 2 and 3 the microprocessor 50 processes signals in memory 52 or from signal receiving unit 48 into a pulse width modulation signal PWM which is periodically released to move the motors 24, 26 and discharge the laser 34. In practice, it is motor 24 moving the laser tool head 12 horizontally over the work surface 14 while the laser is being discharged under the control of the PWM signal, with the microprocessor 50 periodically issuing a command for the motor 26 to shift the head 12 vertically followed by the motor 24 moving the head 12 horizontally but in the opposite direction. It will be understood that the sequence of operation of the two motors may be reversed. The interval or lag, $_t$ between energization and discharge of the laser 34 is measured by a sensor 82 and constitutes a constant $k_1$ for correcting the positioning of the tool head 12 relative to, $_x$. Another constant, $k_2$, corrects the positioning of the tool head 12 relative to the ratio of on to off times $t_{on}/t_{off}$ of the laser 34. A constant $k_3$ corrects the velocity of the movement of the tool head 12 as determined by the decoder 28. The constants $k_1$, $k_2$ and $k_3$ and certain other application specific constants $k_4 \ldots k_n$ are summed H in a summing stage 86 and determine the rate f at which a clock 88 associated with the microprocessor 50 releases the PWM signal.

Figure 4:
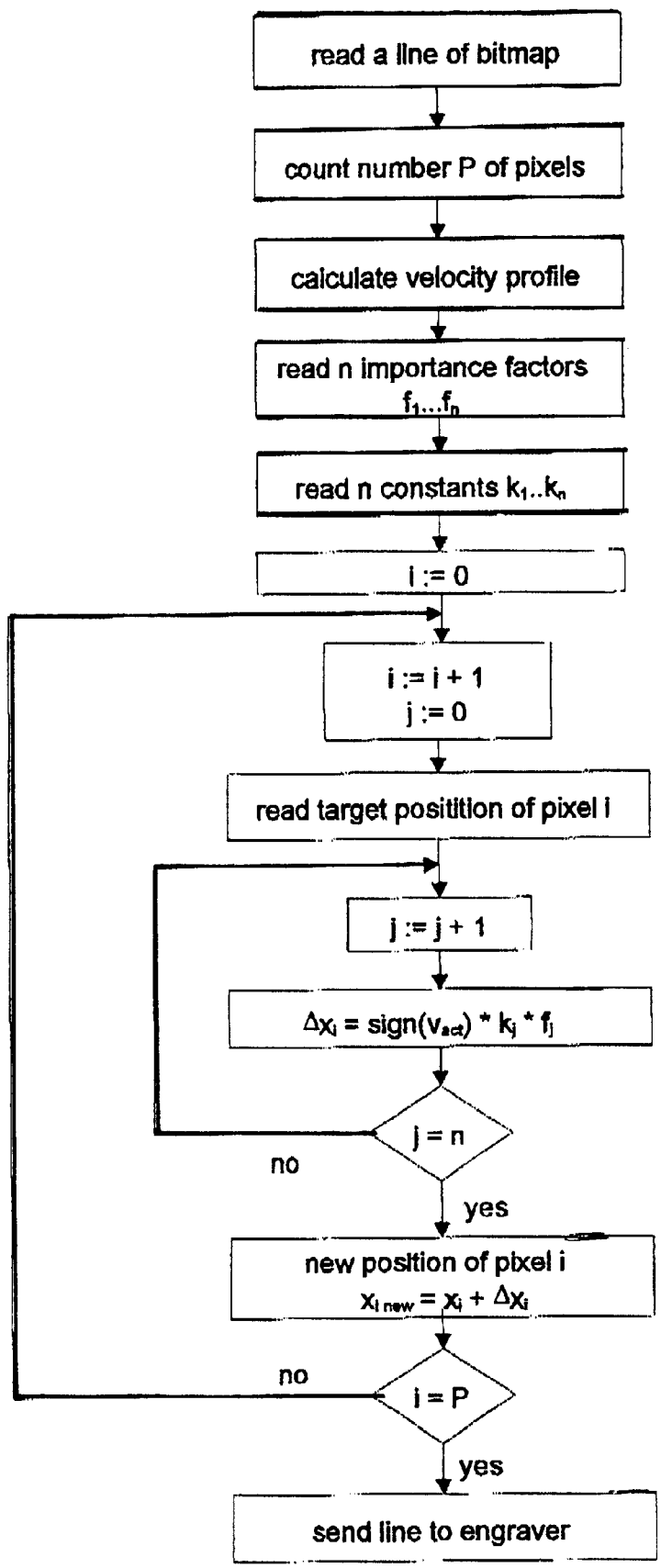
FIG. 4 is a flow diagram of the method in accordance with the invention.
Figure 5:
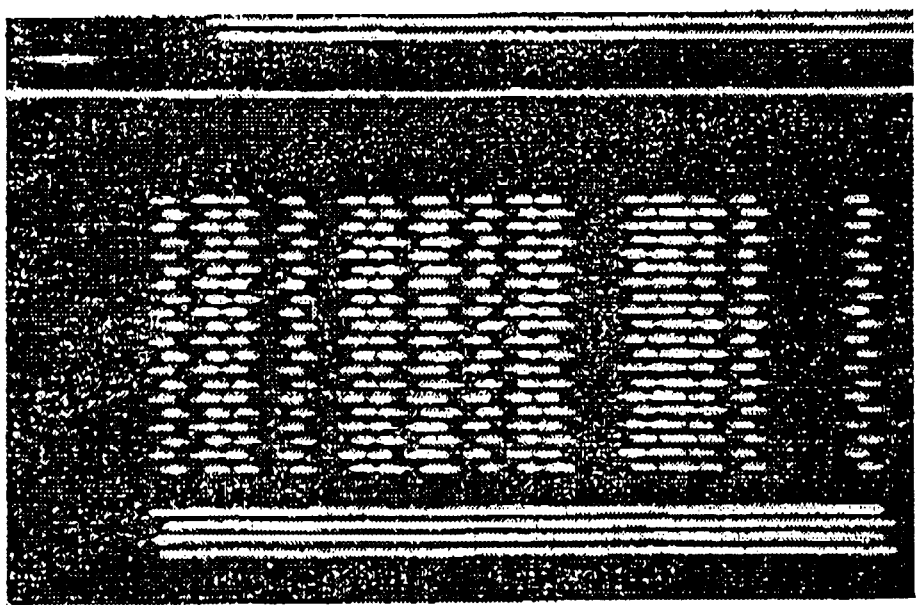
FIG. 5 depicts improperly aligned pixels of an image obtained with certain prior art laser engraving processes.

The function of the circuit shown in FIG. 4 is depicted in the flow diagram of FIG. 4, the described apparatus functions in the following manner: Initially, a line of the pattern or bitmap is scanned and the data thus obtained is downloaded in memory for processing by the microprocessor 50. The microprocessor 50 determines the number of pixels to be formed in the image and calculates the velocity of the laser tool head 12 over a predetermined distance x. Thereafter, it reads in the so-called importance factors $f_1 \ldots f_n$ to determine the position at which a pixel is to be formed or targeted relative to a given position which may be another pixel. The process is repeated until all positions for pixels making up a line have been calculated and the head is then intermittently moved in accordance with a velocity profile matching the pulse width modulation discharge signal of the laser 34 to ensure discharge of the laser 34 when the position of the tool head 12 corresponds to the calculated pixel target.

As a result of the controlled coordination of laser discharge and tool head movement the resultant engraving corresponds exactly to the scanned (or stored) pattern or bitmap. It will be understood that the size of the image produced in this manner may be scaled relative to the pattern.

What is claimed is:

1. A method of forming an image in a surface by a laser beam from a tool head mounted for intermittent parallel movement in orthogonal directions relative thereto, comprising the steps of:

line-scanning a pattern of the image to derive data representative of the image points of the pattern;

on the basis of the data thus derived calculating the velocity of movements of the tool head relative to points corresponding to the image points relative to the time lag between energization and discharge of the laser.

2. The method of claim 1, wherein the data representative of the image points are converted to pulse width modulation signals for controlling the discharge of the laser.

3. The method of claim 2, wherein the pulse width modulation signals are based upon the ratio of on and off times of the laser.

4. The method of claim 3, wherein the velocity of the tool head movements is based upon the pulse width modulation signal.

5. A method of correcting image data in a bidirectional laser engraving process, comprising the steps of:

line-scanning a pattern to derive therefrom data representative of individual image points;

calculating a profile for the velocity of laser movement relative to the time lag between energization and discharge of the laser; and moving the laser in accordance with the profile.

* * * * *